Patented Sept. 22, 1936

2,054,853

UNITED STATES PATENT OFFICE

2,054,853

PROCESS FOR MAKING ALIPHATIC ACID ANHYDRIDES

Henry Dreyfus, London, and Horace Finningley Oxley and Leonard Fallows, Spondon, near Derby, England, assignors to Celanese Corporation of America, a corporation of Delaware No Drawing. Application March 18, 1933, Serial No. 661,570. In Great Britain April 1, 1932

10 Claims. (Cl. 260—123)

This invention relates to the manufacture of aliphatic anhydrides by the thermal decomposition of aliphatic acids, and especially to the manufacture of acetic anhydride by the thermal decomposition of acetic acid.

As is known, the thermal decomposition of acetic or other aliphatic acids into anhydride can be accelerated in presence of catalysts, and large numbers of catalysts have been proposed including solid, molten or liquid, or gaseous catalysts.

These catalysts are of two types, namely, general catalysts, i. e. those which catalytically influence reactions in general usually by reason of a high surface development and catalysts which are normally specific to the production of anhydrides, i. e. those which catalyze this particular process but do not catalytically influence reactions in general and may even have no application at all as catalysts apart from the production of aliphatic anhydrides.

It has now been found that the catalytic scission of the acids to anhydrides with the aid of the so-called specific catalysts can be greatly enhanced or accelerated and the action of the catalysts promoted by the presence, together with the catalysts, of difficultly reducible oxides, and particularly oxides of the alkaline earth metals and of aluminum, titanium and vanadium.

The invention is not limited as to the catalysts employed but the greatest advantages of the invention are not obtained when the catalysts used consist of or contain free acids or other bodies having a tendency to combine chemically, for instance during use, with metal oxides as such combination diminishes the promoting action of the latter. Salts of weak or relatively weak acids such as metal phosphates, e. g. metaphosphates of alkali metals, arsenates, stibinates, tungstates (other than alkali metal tungstates), borates such as alkali metal borates, may be mentioned as instances of catalysts that are very useful for the purposes of the invention.

Conveniently the acetic or other aliphatic acid vapor may be passed in a stream through a molten bath comprising the catalyst and one or more of the promoters, e. g. a molten bath of sodium metaphosphate and alumina, titanium oxide or vanadium oxide. Alternatively the promoters with catalysts may be employed in solid form in which case the acid vapor may be passed in a stream over the catalysts and promoters, preferably mounted on or mixed with carriers, contained in tubular or other suitable apparatus.

The relative proportions of catalyst and promoter may vary considerably. In general, however, quantities of promoter of between about 2% and 40%, and especially between about 5% and 25% relatively to the catalyst, enable highly satisfactory results to be obtained.

The following are examples of catalysts promoted by the addition of suitable quantities of metal oxides.

Molten sodium metaphosphate containing 2% of normal sodium phosphate+5% lime.

Molten sodium metaphosphate+7% strontia.

Molten metaphosphate containing 2% normal sodium phosphate+4% titanium dioxide.

Solid calcium tungstate+10% lime.

Solid calcium tungstate+5% alumina.

Solid calcium tungstate+13% vanadium pentoxide.

Intimate admixture of the promoter and catalyst may be effected in any convenient manner. With molten catalysts, for instance those specified above, preferably the oxide is mixed with the catalyst materials before the latter are melted. With solid catalysts the metal oxides may be kneaded with the freshly prepared catalyst or the latter may be impregnated with a solution of the hydroxide of the metal whose oxide is to be used to promote the catalyst, when this hydroxide is soluble, the impregnated product being dried and the impregnation and drying steps repeated until the desired concentration of oxide is attained. For instance, in the case of the solid catalysts specified above, calcium tungstate (freshly precipitated from a sodium tungstate solution by the addition of a calcium chloride solution and washed) may be kneaded with the lime, alumina or vanadium pentoxide, or when lime is the promoter, the calcium tungstate may be dried and impregnated with lime water and the product again dried, this process being repeated until the desired percentage of calcium oxide is attained.

The thermal decomposition of the aliphatic acid may be effected at temperatures such as those usually employed, temperatures of between about 350 and 800° C. and especially between 550 and 700° C. being particularly advantageous.

Before being subjected to thermal decomposition the acetic or other aliphatic acid vapor may be preheated to any desired temperature, temperatures of between 250 and 350° C. being particularly advantageous. Such preheating may be effected, for instance, by heat exchange with products of the thermal decomposition, by passage through heated tubes preferably containing filling material of high thermal conductivity, by passage through baths of molten material or by a combination of such methods.

Vapor or pure acetic or other aliphatic acid may be subjected to thermal decomposition or the vapor of the acid may be diluted with inert gases or vapors. Similarly aqueous acetic or other aliphatic acid may be vaporized and the vaporous product employed. Preferably, however, the vapor of the acid is subjected to thermal decomposition whilst in admixture with limited quantities of water vapor, as described in U. S. application S. No. 661,569 filed on even date herewith, since the presence of such limited quantities of water diminishes decomposition of the acid to undesired products. Moreover, the presence of water may often serve to prolong the active effect of the promoter. Usually quantities of water between about 5% and 25%, and especially between 8% and 15%, of the weight of the acid are very useful. Similar quantities of water may be used with propionic acid or other higher acids, though the use of somewhat higher quantities, e. g. up to about 30%, is often of advantage with such acids. Quantities of water substantially exceeding about 35% lead to the presence of unnecessarily large quantities of water in the reaction products with consequent liability to hydrolyze the anhydride.

The anhydride may be recovered from the reaction vapors in any convenient way. Preferably the anhydride is condensed from the vapors whilst maintaining the water in vapor form, for instance by processes such as described in British Patent No. 303,772, or processes involving the removal of water vapor from the reaction vapors or separation of water simultaneously with the condensation, such for instance as the processes described in U. S. Patents Nos. 1,817,614, 1,915,573 and 1,931,687.

What we claim and desire to secure by Letters Patent is:—

1. Process for the manufacture of an aliphatic anhydride, which comprises thermally decomposing an aliphatic acid in presence of a catalyst salt of a relatively weak acid, said catalyst salt being promoted by a difficultly reducible oxide of a metal less electropositive than sodium.

2. Process for the manufacture of an aliphatic anhydride, which comprises thermally decomposing an aliphatic acid in presence of a catalyst salt of a relatively weak acid, said catalyst salt being promoted by an alkaline earth metal oxide.

3. Process for the manufacture of an aliphatic anhydride, which comprises thermally decomposing at temperatures of 550 to 800° C., an aliphatic acid in presence of an alkali metal phosphate catalyst, said catalyst being promoted by an alkaline earth metal oxide.

4. Process for the manufacture of an aliphatic anhydride, which comprises thermally decomposing at temperatures of 550 to 800° C., an aliphatic acid in presence of an alkali metal phosphate catalyst, said catalyst being promoted by an oxide of a metal selected from the group consisting of aluminum, titanium and vanadium.

5. Process for the manufacture of an aliphatic anhydride, which comprises thermally decomposing at temperatures of 550 to 800° C., an aliphatic acid in presence of an alkaline earth metal tungstate catalyst, said catalyst being promoted by an alkaline earth metal oxide.

6. Process for the manufacture of acetic anhydride, which comprises thermally decomposing acetic acid in presence of a catalyst salt of a relatively weak acid, said catalyst salt being promoted by a difficultly reducible oxide of a metal less electropositive than sodium.

7. Process for the manufacture of acetic anhydride, which comprises thermally decomposing acetic acid in presence of a catalyst salt of a relatively weak acid, said catalyst salt being promoted by an alkaline earth metal oxide.

8. Process for the manufacture of acetic anhydride, which comprises thermally decomposing at temperatures of 550 to 800° C. acetic acid in presence of an alkali metal phosphate catalyst, said catalyst being promoted by an alkaline earth metal oxide.

9. Process for the manufacture of acetic anhydride, which comprises thermally decomposing at temperatures of 550 to 800° C. acetic acid in presence of an alkali metal phosphate catalyst, said catalyst being promoted by an oxide of a metal selected from the group consisting of aluminum, titanium and vanadium.

10. Process for the manufacture of acetic anhydride, which comprises thermally decomposing at temperatures of 550 to 800° C. acetic acid in presence of an alkaline earth metal tungstate catalyst, said catalyst being promoted by an alkaline earth metal oxide.

HENRY DREYFUS.
HORACE FINNINGLEY OXLEY.
LEONARD FALLOWS.

CERTIFICATE OF CORRECTION.

Patent No. 2,054,853.  September 22, 1936.

HENRY DREYFUS, ET AL.

It is hereby certified that error appears in the printed specification of the above numbered patent requiring correction as follows: Page 1, first column, line 26, after the word "reducible" insert metal; and that the said Letters Patent should be read with this correction therein that the same may conform to the record of the case in the Patent Office.

Signed and sealed this 1st day of December, A. D. 1936.

Henry Van Arsdale (Seal)  Acting Commissioner of Patents.